US008386816B2

(12) United States Patent
Elsilä et al.

(10) Patent No.: US 8,386,816 B2
(45) Date of Patent: Feb. 26, 2013

(54) METHODS, APPARATUSES, AND COMPUTER PROGRAM PRODUCTS FOR REDUCING POWER CONSUMPTION IN COMPUTING DEVICES

(75) Inventors: Janne Antti Petteri Elsilä, Oulunsalo (FI); Hannu Kalliomaa, Helsinki (FI); Tero T. Karkkainen, Hämeenkyro (FI); Jussi E. Mäki, Espoo (FI); Kevin Quigley, West Sussex (GB); Mark Zurich, Andover, MA (US)

(73) Assignee: Nokia Corporation, Espoo (FI)

( * ) Notice: Subject to any disclaimer, the term of this patent is extended or adjusted under 35 U.S.C. 154(b) by 1062 days.

(21) Appl. No.: 12/261,380

(22) Filed: Oct. 30, 2008

(65) Prior Publication Data

US 2010/0115259 A1 May 6, 2010

(51) Int. Cl.
*G06F 1/26* (2006.01)
(52) U.S. Cl. .......................................... 713/320; 307/39
(58) Field of Classification Search .......... 713/300–320, 713/340; 307/38–39
See application file for complete search history.

(56) References Cited

U.S. PATENT DOCUMENTS 8,010,815 B2 * 8/2011 Hamilton et al. ............. 713/320
2012/0074782 A1 * 3/2012 Hodges et al. ................. 307/39

OTHER PUBLICATIONS

The Microsoft Windows Team, Microsoft Press, "Microsoft Windows XP Professional Resource Kit;" Second Edition, 2003.

* cited by examiner

*Primary Examiner* — Clifford Knoll
(74) *Attorney, Agent, or Firm* — Alston & Bird LLP

(57) ABSTRACT

A method, apparatus, and computer program product are provided for reducing power consumption in computing devices. An apparatus may include a processor configured to provide a user interface allowing a user to select a device power profile from a plurality of available device power profiles. The processor may be further configured to receive an indication of a selection of a device power profile. The processor may additionally be configured to implement the selected device power profile based at least in part upon the received indication. The processor may also be configured to measure power consumed by the device and calculate power consumption statistics based at least in part upon the measured power consumed. The processor may further be configured to send the calculated power consumption statistics to a community power savings portal. Corresponding methods and computer program products are also provided.

24 Claims, 6 Drawing Sheets

METHODS, APPARATUSES, AND COMPUTER PROGRAM PRODUCTS FOR REDUCING POWER CONSUMPTION IN COMPUTING DEVICES

TECHNOLOGICAL FIELD

Embodiments of the present invention relate generally to communication technology and, more particularly, relate to methods, apparatuses, and computer program products for reducing power consumption in computing devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. This explosive growth of mobile communications networks has followed the evolution of mobile devices, such as cellular phones, personal digital assistants (PDAs), and other portable electronic devices from luxury items to ubiquitous devices integrated into the everyday lives of individuals from all walks of life. The widespread adoption of mobile devices and expanding capabilities of the wireless networks over which they communicate has allowed for a tremendous expansion in the functionalities which mobile devices are capable of executing. In addition to providing for phone service, many mobile devices now execute functionalities such as navigation services through the use of GPS, camera and video capturing capabilities, digital music and video playback, and web browsing, which may be facilitated through access to multiple networks provided by one or more radios embodied on mobile devices.

While this expansion in functionality of mobile devices has been revolutionary, it does have a drawback in that each added functionality requires additional power to execute and in some cases, the power consumption of some functionalities, such as, for example, a camera with a flash, GPS receiver, or multiple operational radios so as to facilitate access to cellular networks, wireless local area networks, and/or other networks may be quite substantial. With the prevalence of mobile devices in use today, it can be appreciated that in the aggregate, power consumption by mobile devices in use throughout the world is quite substantial. The power consumed by 10 million mobile devices may total 10,130 megawatt hours of power per year.

Power used to charge the batteries which power mobile devices is often supplied by power grids supplying electricity generated from non-renewable resources, such as fossil fuels. Not only may these non-renewable resources be in short supply, but use of these non-renewable resources to produce electricity for power grids may contribute to global warming and/or otherwise harm the environment. Further, in some regions, power grids may be strained to provide enough power to satisfy power demand. Accordingly, power that could otherwise be used, for example, to heat homes may instead be used to power mobile devices.

Additionally, with increasing media focus on the uncertainty surrounding future environmental conditions, consumers are becoming increasingly eco-conscious and aware of their personal carbon footprints. Accordingly, many consumers aware of measures that they may personally take to reduce environmental impact and conserve energy are taking steps to reduce their carbon footprint. If consumers were provided with mobile devices configured to reduce power consumption and were informed about such power reduction, consumers may take steps to reduce power usage in their personal computing devices. Such reductions in power usage by a large community of users may in the aggregate significantly reduce environmental impact, conserve resources, and free up power for use for other purposes, such as heating homes. Accordingly, it would be advantageous to provide methods, apparatuses, and computer program products for reducing power consumption in computing devices.

BRIEF SUMMARY OF SOME EXAMPLES OF THE INVENTION

A method, apparatus, and computer program product are therefore provided for reducing power consumption in computing devices. In this regard, a method, apparatus, and computer program product may be provided that may provide several advantages to a user of a computing device. Embodiments of the invention may provide for reducing power consumed by computing devices and thus may reduce the environmental impact of computing device usage. In this regard, embodiments of the invention may provide for a power savings community that may promote eco-awareness by facilitating the dissemination of information about how to reduce power usage in computing devices and may provide users of the community with information about their standing in the community with respect to an amount of power each user has saved in their computing device by altering configuration settings to conserve power through implementation of a device power profile. Embodiments of the invention may accordingly provide for monitoring power consumption in a computing device and calculating power consumption statistics based at least in part upon the measured power consumed, which may indicate how much power consumption in a computing device has been reduced from a baseline power consumption level for the computing device through implementation of a device power profile. Accordingly, users may benefit from reduced operating costs due to reduced power consumption, reduced environmental impact, and a positive feeling resulting from taking steps to help the environment.

In a first exemplary embodiment, a method is provided, which may include providing a user interface allowing a user to select a device power profile from a plurality of available device power profiles. Each device power profile may define one or more configuration settings to manage power consumption in the device. The method may further include receiving an indication of a selection of a device power profile. The method may additionally include implementing the selected device power profile based at least in part upon the received indication. The method may also include measuring power consumed by the device. The method may further include calculating power consumption statistics based at least in part upon the measured power consumed. In some embodiments, the method may further include sending the calculated power consumption statistics to a community power savings portal. The community power savings portal may comprise a remote network device configured to receive power consumption statistics from a plurality of devices and aggregate the received power consumption statistics. The method may also include receiving aggregated community power consumption statistics from the community power savings portal.

In another exemplary embodiment, a method is provided, which may include receiving power consumption statistics from a plurality of devices associated with a power savings community. The method may further include aggregating the received power consumption statistics. The method may also include providing the aggregated power consumption statistics to a remote device.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for providing a user interface allowing a user to select a device power profile from a plurality of available device power profiles. Each device power profile may define one or more configuration settings to manage power consumption in the device. The second program instruction is for receiving an indication of a selection of a device power profile. The third program instruction is for implementing the selected device power profile based at least in part upon the received indication. The fourth program instruction is for measuring power consumed by the device. The fifth program instruction is for calculating power consumption statistics based at least in part upon the measured power consumed. The sixth program instruction is for sending the calculated power consumption statistics to a community power savings portal. The community power savings portal may comprise a remote network device configured to receive power consumption statistics from a plurality of devices and aggregate the received power consumption statistics. The seventh program instruction is for receiving aggregated community power consumption statistics from the community power savings portal.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for receiving power consumption statistics from a plurality of devices associated with a power savings community. The second program instruction is for aggregating the received power consumption statistics. The third program instruction is for providing the aggregated power consumption statistics to a remote device.

In another exemplary embodiment, an apparatus is provided, which may include a processor configured to provide a user interface allowing a user to select a device power profile from a plurality of available device power profiles. Each device power profile may define one or more configuration settings to manage power consumption in the device. The processor may be further configured to receive an indication of a selection of a device power profile. The processor may additionally be configured to implement the selected device power profile based at least in part upon the received indication. The processor may also be configured to measure power consumed by the device. The processor may be further configured to calculate power consumption statistics based at least in part upon the measured power consumed. In some embodiments, the processor may also be configured to send the calculated power consumption statistics to a community power savings portal. The community power savings portal may comprise a remote network device configured to receive power consumption statistics from a plurality of devices and aggregate the received power consumption statistics. The processor may be additionally configured to receive aggregated community power consumption statistics from the community power savings portal.

In another exemplary embodiment, an apparatus is provided, which may include a processor configured to receive power consumption statistics from a plurality of devices associated with a power savings community. The processor may be further configured to aggregate the received power consumption statistics. The processor may also be configured to provide the aggregated power consumption statistics to a remote device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
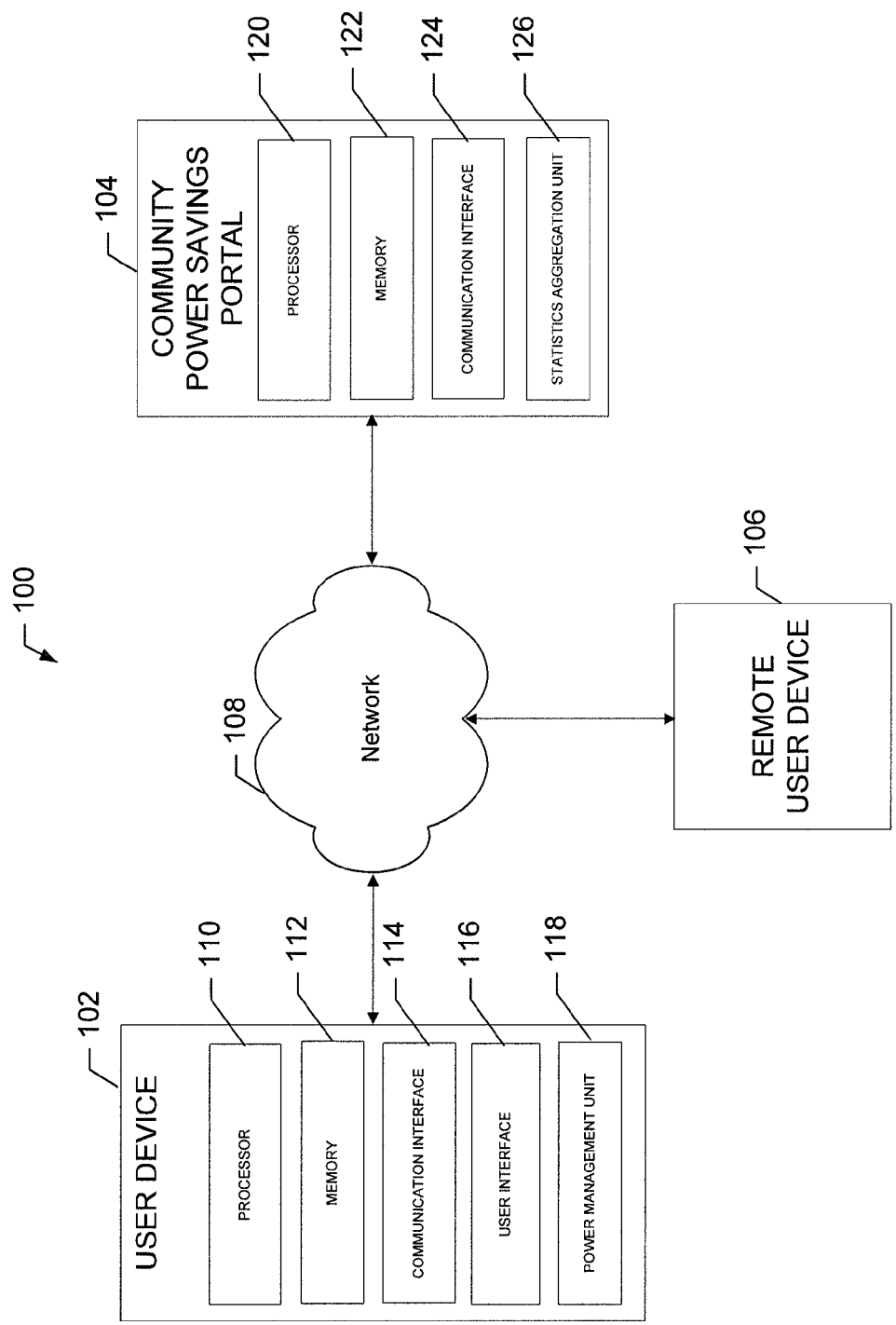
FIG. 1 illustrates a block diagram of a system for conserving power in computing devices according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, a "configuration setting" refers to a setting defining an operating parameter for a component of a computing device that may be embodied in software, firmware, hardware, or some combination thereof. As such, it will be appreciated that a "component" is not limited to being embodied in tangible hardware components and may comprise an application defined in software that may be executed by a processor of a computing device. A configuration setting may define a variable operating parameter for which varying the value of the configuration setting may affect power consumed through operation of the component. For example, a configuration setting may control a brightness level for a display. The amount of power consumed by operation of the display may be directly proportional to the brightness level of the display. Thus, adjusting the configuration setting to reduce the brightness of the display may reduce the power consumed by operation of the display. In another example, a configuration setting may define a timeout period for an otherwise always-on network connection such that the network connection may be disconnected after a period of inactivity greater than the timeout period such that power consumption may be reduced.

A "device power profile" as used herein refers to a predefined set of one or more configuration settings defining operating parameters for one or more computing device components that may be embodied in software, firmware, hardware, or some combination thereof. A device power profile may be defined by a manufacturer of a computing device or a distributor of some component installed on the computing device. Additionally or alternatively, a device power profile may be defined by a user of a computing device.

FIG. 1 illustrates a block diagram of a system 100 for reducing power consumption in computing devices according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for reducing power consumption in computing devices, numerous other configurations may also be used to implement embodiments of the present invention.

Referring now to FIG. 1, the system 100 may include a user device 102, community power savings portal 104, and a remote user device 106 configured to communicate over a network 108. The network 108 may comprise a wireline network, wireless network, or some combination thereof, and in an exemplary embodiment may comprise or otherwise be embodied as the internet. The user device 102 and/or the remote user device 106 may be embodied as a server, desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. Accordingly, a remote user device 106 may be embodied as a computing device substantially similar to a user device 102, but comprises a computing device associated with a user remote from the perspective of a user of the user device 102. In an exemplary embodiment, the user device 102 and/or remote user device 106 may be embodied as a mobile terminal, such as that illustrated in FIG. 2

Figure 2:
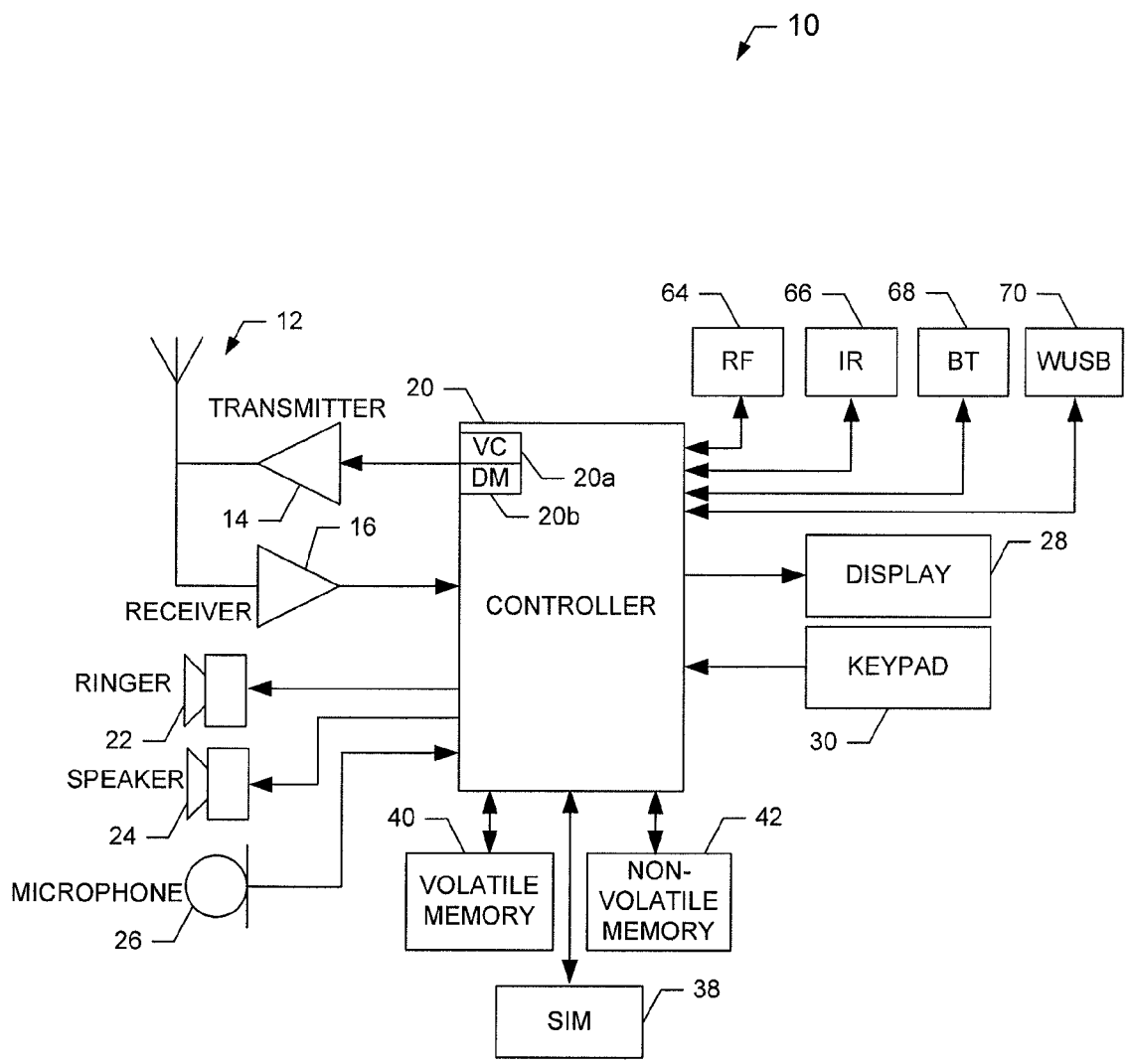
FIG. 2 is a schematic block diagram of a mobile terminal according to an exemplary embodiment of the present invention.

In this regard, FIG. 2 illustrates a block diagram of a mobile terminal 10 representative of one embodiment of a user device 102 and/or remote user device 106 in accordance with embodiments of the present invention. It should be understood, however, that the mobile terminal illustrated and hereinafter described is merely illustrative of one type of user device 102 and/or remote user device 106 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, the user device 102 and/or remote user device 106 are not limited to being embodied as a mobile terminal 10 and as previously described, may be embodied as any computing device, mobile or fixed. The community power savings portal 104 may be embodied as any computing device or plurality of computing devices configured to provide information and services related to reducing power consumption to a community of users of user devices 102 and/or remote user devices 106 as will be described further herein. Although only a single user device 102 and a single remote user device 106 are illustrated in FIG. 1, the system 100 may comprise a plurality of user devices 102 and/or remote user devices 106.

Referring again to the user device 102, the host device 102 may include various means, such as a processor 110, memory 112, communication interface 114, user interface 116, and power management unit 118 for performing the various functions herein described. These means of the user device 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In embodiments wherein the user device 102 is embodied as a mobile terminal 10, the processor 110 may be embodied as or otherwise comprise the controller 20. In an exemplary embodiment, the processor 110 may be configured to execute instructions stored in the memory 112 or otherwise accessible to the processor 110. Although illustrated in FIG. 1 as a single processor, the processor 110 may comprise a plurality of processors.

The memory 112 may include, for example, volatile and/or non-volatile memory. The memory 112 may be configured to store information, data, applications, instructions, or the like for enabling the user device 102 to carry out various functions in accordance with exemplary embodiments of the present invention. For example, the memory 112 may be configured to buffer input data for processing by the processor 110. Additionally or alternatively, the memory 112 may be configured to store instructions for execution by the processor 110. The memory 112 may comprise one or more databases that store information in the form of static and/or dynamic information. In this regard, the memory 112 may store, for example, data about power consumed by one or more components of the user device 102, calculated power consumption statistics, and/or the like. This stored information may be stored and/or used by the power management unit 118 during the course of performing its functionalities.

The communication interface 114 may be embodied as any device or means embodied in hardware, software, firmware, or a combination thereof that is configured to receive and/or transmit data from/to a remote device, such as a community power savings portal 104 and/or remote user device 106 over the network 108. In one embodiment, the communication interface 114 may be at least partially embodied as or otherwise controlled by the processor 110. The communication interface 114 may include, for example, an antenna, a transmitter, a receiver, a transceiver and/or supporting hardware or software for enabling communications with other entities of the system 100. The communication interface 114 may be configured to receive and/or transmit data using any protocol that may be used for communications between computing devices of the system 100. The communication interface 114 may additionally be in communication with the memory 112, user interface 116, and/or power management unit 118, such as via a bus.

The user interface 116 may be in communication with the processor 110 to receive an indication of a user input and/or to provide an audible, visual, mechanical, or other output to the user. As such, the user interface 116 may include, for example, a keyboard, a mouse, a joystick, a display, a touch screen display, a microphone, a speaker, and/or other input/output mechanisms. The user interface 116 may be configured to provide means for a user to browse a plurality of available device power profiles and select a device power profile from the plurality of available power profiles. The user interface 116 may be further configured to provide means for a user to adjust one or more configuration settings and in an exemplary embodiment may be configured to provide means for a user to define a new device power profile and/or revise an existing device power profile by adjusting one or more configuration settings. The user interface 116 may be in communication with the memory 112, communication interface 116, and/or power management unit 118, such as via a bus.

Figure 3C:
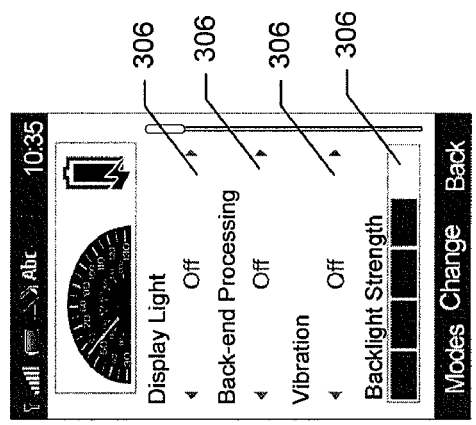
FIG. 3 illustrates a series of screenshots of a user interface for selecting a device power profile according to an exemplary embodiment of the present invention.
Figure 3B:
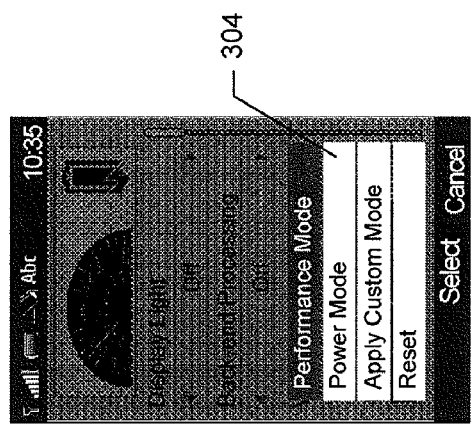
Figure 3A:
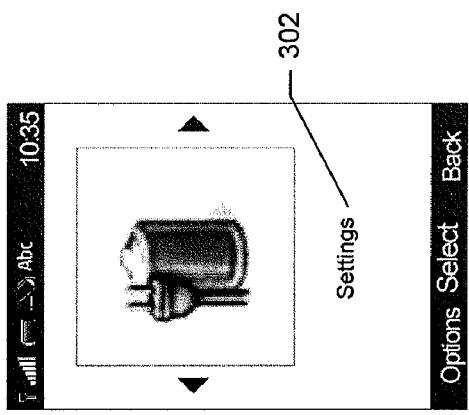

The power management unit 118 may be embodied as various means, such as hardware, software, firmware, or some combination thereof and, in one embodiment, may be embodied as or otherwise controlled by the processor 110. In embodiments where the power management unit 118 is embodied separately from the processor 110, the power management unit 118 may be in communication with the processor 110. The power management unit 118 may be configured to provide or otherwise control a user interface allowing a user to select a device profile from a plurality of available device profiles. In this regard, the power management unit 118 may, for example, be configured to cause a means of selection to be displayed on a display of the user interface 116. For example, such a user interface that may be provided by the power management unit 118 may comprise a plurality of configuration screens such as those of FIG. 3. A user may, for example, select a settings option 302 as illustrated in FIG. 3a. The power management unit 118 may then cause a plurality of available device power profile selection options 304 to be displayed on the user interface as illustrated in FIG. 3b. The power management unit 118 may further be configured to receive an indication of a user selection of a device power profile from the plurality of available device power profiles. This selection may be received via any input means of the user interface 116 and may include, for example, depressing a key, touching an area of a display if the user interface 116 comprises a touch screen display, receipt of a voice command in a microphone input, and/or the like. It will be appreciated, however, that FIG. 3 illustrates only one example of a user interface and selection option for providing available device power profiles and receiving an indication of a selection of a device power profile. Accordingly, other graphical arrangements may be used and in some embodiments, entirely non-graphical user interface elements, such as selection through designated keys may be implemented.

In some embodiments, the power management unit 118 may be configured to provide means for a user to select and/or adjust one or more configuration settings. In this regard, a user may be able to define a new device power profile and/or revise an existing device power profile by adjusting one or more configuration settings. For example, a user may select to modify an existing device power profile and/or may select to create a new device power profile, such as by selecting the device power profile selection option 304 labeled "Apply Custom Mode" as shown in FIG. 3b. The power management unit 118 may then, for example, cause a plurality of configuration settings options 306 to be displayed on a display of the user interface 116 as illustrated in FIG. 3c. Accordingly, a user may adjust configuration settings defining, for example, intensity of a display backlight, vibration strength, ring tone volume, and/or the like. The power management unit 118 may accordingly be configured to receive one or more configuration settings defined by a user via the user interface 116. If a user has selected to create a new device power profile, the power management unit 118 may be configured to define a new device power profile based at least in part upon the received configuration settings. The power management unit 118 may be configured to store the new device power profile and/or configuration settings in memory 112. Accordingly, following defining the new device power profile, when a user is presented with a plurality of available device power profiles to select from, the plurality of available device power profiles will include the newly created device power profile.

In some embodiments, a user of a user device 102 may receive an incentive to select a device power profile that may reduce power consumption in the user device 102. For example, the community power savings portal 104 may provide additional service offerings, discounts on services, and/or the like to users who implement a power efficient device power profile and/or otherwise participate in services offered by the community power savings portal 104.

The power management unit 118 may additionally be configured to implement a selected device power profile. In this regard, the power management unit 118 may be configured to implement the configuration settings that comprise the device power profile. In this regard, the power management unit 118 may be configured to control the intensity of a display backlight and/or the intensity of keypad backlights based at least in part upon one or more configuration settings comprising the implemented device power profile. The power management unit 118 may be configured to reduce display backlight intensity without compromising the readability of a display by increasing the contrast dynamics of a displayed image. In this regard, spatial dynamic range correction may be implemented to achieve optimum contrast without requiring a high illumination intensity. Accordingly, for example, power consumed by the user device 102 may be reduced by reducing the intensity of the display backlight. In another example, a configuration setting may define a timeout period for a period of inactivity after which the display backlight and/or keypad backlight will be dimmed or will no longer be illuminated. In this regard, the shorter the timeout period, the more power consumption may be reduced.

Other configuration settings that the power management unit 118 may implement may define settings to announce receipt of incoming phone calls, emails, text messages, instant messages, and/or the like by the user device 102. These configuration settings may define, for example, intensity of a vibration, volume of a ring tune, and/or the like. Accordingly, configuration settings reducing the volume of a ring tune, reducing intensity of vibration, and/or disabling vibration may reduce power consumed by the user device 102. Still other configuration settings may control the annunciation of actions taken on the user device 102, such as in response to data entry. In this regard, for example, a configuration setting may define the volume of an audible tone played when a key of a keypad is depressed by a user. By reducing the tone volume or eliminating the tone altogether, power consumption may be reduced.

Still other configuration settings that may be implemented by the power management unit 118 may control components of the user device 102. For example, configuration settings may control the implementation and usage of radios on the user device 102. In this regard, a "radio" may be any hardware, software, firmware, or combination thereof that facilitates transmission and/or receipt of data and/or other communications, such as may be used to facilitate functionality of applications and/or hardware devices embodied on a computing device and thus one or more radios may comprise or otherwise be provided by the communication interface 114. Examples of radios include, but are not limited to, cellular radio transceivers (e.g., wideband code division multiple access (WCDMA), general packet radio service (GPRS), global standard for mobile communications (GSM) etc), wireless local access network (LAN) transceivers, Bluetooth radio transceivers, and Global Positioning System (GPS) transceivers. Configuration settings may define a timeout period after which a radio will be disabled. In radios where the user device may boost the power of a transceiver in order to enhance range, a configuration setting may control the amount of power boost such that range may be sacrificed to reduce power consumption.

Configuration settings may define parameters to enable the power management unit 118 to make an intelligent selection of a radio bearer over which to initiate outgoing communications with remote devices, such as other devices of the system 100. For example, the power management unit 118 may be configured to select an appropriate radio bearer based upon the active application in use, location of the user device 102, as well as other applicable factors to achieve an optimum balance between power consumption and device performance, such as may be defined by the applicable configuration setting. For example, the power management unit 118 may opt for a radio bearer offering slower data rates than another radio bearer in order to save power based at least in part upon implemented configuration settings. In another example, the power management unit 118 may be configured to select a radio bearer based upon the type of data to be transmitted. For example, the power management unit 118 may be configured to use a GSM radio bearer for voice communications and a WCDMA radio bearer for data communications so as to better manage power consumption.

Still other configuration settings may control the selection of protocols used by components of the user device 102. For example, a communications protocol used by an email program may be selected based upon power consumed through usage of each available protocol. In this regard, internet message access protocol (IMAP) push email may be implemented by the power management unit 118 whenever available as the protocol may consume less power than post office protocol version 3 (POP3).

The power management unit 118 may further be configured to implement configuration settings in a device power profile that may manage the processor 110. For example, a configuration setting may define a central processing unit (CPU) sleep time, which may define a timeout period after which the processor 110 may be placed in a sleep mode, or period in which the processor 110's active functionality is limited so as to reduce power consumed by the processor 110. Other configuration settings that may be implemented by the power management unit 118 may define a clock rate that may drive the processor 110. In this regard, the power management unit 118 may be configured to underclock the processor 110 based at least in part upon a configuration setting such that power consumption is reduced, albeit at the expense of lost processing power. This underclocking may be constant, or may be variable such that the power management unit 118 may intelligently vary the clock rate based at least in part upon an application or task currently being executed by the processor 110. Thus for more processing intensive and/or higher priority applications, the clock rate may not be reduced from a standard operating rate and/or may be reduced less than for less intensive and/or lower priority applications.

In some embodiments, the power management unit 118 may be configured to implement configuration settings that may reduce power consumption by implementing an intelligent proxy/backing to reduce power consumed by front ends. In this regard, for example, power consumption may be reduced through implementation of a lazy discussion protocol for communications with remote devices when using one or more always-on instant messaging (IM) services and/or e-mail accounts. For example, the power management unit 118 may be configured to use a remote proxy server to handle all communications to different e-mail and/or IM service providers. The power management unit 118 may then receive e-mail and/or IM messages from the proxy server as the proxy server retrieves them. Accordingly, the proxy server may handle all polling of the e-mail and/or IM service providers so that the user device 102 does not unnecessarily expend power through periodic polling of e-mail and/or IM service providers. In some embodiments, the power management unit 118 may be configured to terminate a radio connection to the proxy server, e-mail service provider(s) and/or IM service provider(s) completely. The power management unit 118 may then receive a push message, such as, for example, a short message service message, from the proxy server to trigger the power management unit 118 to reestablish a connection so that the power management unit 118 may receive incoming messages.

In some embodiments, the power management unit may be configured to implement adaptive device power profiles. In this regard, configuration settings comprising a device power profile may be adaptively implemented based at least in part upon sensory information about a current state of the user device 102. Accordingly, the power management unit 118 may be configured to receive sensory information. The sensory information may comprise any information about a state of the user device 102 that may be detected and/or received by the user device 102. Such sensory information may include, for example, a current time of day, a current date, whether the user device 102 is in motion, a current location of the user device 102, applications in use on the user device 102, whether the user device 102 is being actively used, and/or the like. Accordingly, the power management unit 118 may adaptively implement a configuration setting based upon received sensory information. For example, display illumination settings may be adaptively implemented depending on whether the user device 102 is in motion, as it may be harder for a user to read a display if the user device 102 is unstable and thus a higher level of illumination may be needed for the display backlight. In another example, power consumption in the user device 102 may be adaptively reduced depending on the time of day, such as, for example, by shutting down non-essential components during late night hours when the user device 102 is not in use. As already described, configuration settings may be adaptively implemented based upon usage of radios, application usage, and/or the like.

In an exemplary embodiment, the power management unit 118 may be configured to measure power consumed by the user device 102 and calculate one or more power consumption statistics based at least in part upon the measured power consumed. The power management unit 118 may store the measured power consumed and/or calculated power consumption statistics in the memory 112. These calculated power consumption statistics may comprise, for example, a total amount of power consumed by the user device 102 over a period of time, itemized amount of power consumed by each of one or more components of the user device 102 over a period of time, an amount by which user device 102 power consumption has been reduced over a period of time through implementation of a device power profile, and/or the like. In this regard, the power management unit 118 may be configured to calculate power saved in the user device 102 by comparing actual measured power consumed by the user device 102 to a pre-measured and/or predefined baseline power consumption level for the user device 102 representing the amount of power that would be consumed if a device power profile comprising factory default configuration settings and/or average (e.g., most popular) configuration settings were implemented. The power management unit 118 may additionally or alternatively be configured to calculate power saved by one or more individual components of the user device 102 by comparing actual measured power consumed by each of the one or more components to a baseline power consumption level for each component. The power management unit 118 may be configured to provide the calculated power consumption statistics to a user of the user device 102, such as by causing the calculated statistics to be displayed on a display of the user device 102.

In an exemplary embodiment, the power management unit 118 may be configured to send calculated power consumption statistics to a remote device, such as, for example, the community power savings portal 104. The power management unit 118 may further be configured to receive aggregated community power consumption statistics from the community power savings portal. These community power consumption statistics may be received in response to a request sent to the community power savings portal 104 by the power management unit 118, such as in response to a query or request of a user of the user device 102. In this regard, a user may utilize the user interface 116 to make a request and/or otherwise access community power savings statistics, such as using a web interface that may be provided by the community power savings portal 104. The aggregated community power consumption statistics may comprise power consumption statistics sent to the community power savings portal 104 from a plurality of devices (e.g., user devices 102, remote user devices 106) of the system 100, which collectively comprise a power savings community. The community power consumption statistics may be aggregated by the community power savings portal so that a user device 102 may access aggregated information about the power consumption of the power savings community. For example, the power management unit 118 may receive aggregated community power consumption statistics detailing a total amount of power saved by users of a plurality of devices in the power savings community over a period of time. In another example, the power management unit 118 may receive aggregated community power consumption statistics detailing an ordered ranking of a plurality of users of the power savings community based at least in part upon the amount of power saved by a user device 102 associated with each respective user. Accordingly, a user may view where he stands amongst other users in the power savings community in terms of how much power the user has saved through implementation of a device power profile comprising configuration settings for reducing power consumption in the user's user device 102. This ranking of users may encourage users to attempt to save additional power, such as by implementing another device power profile and/or by altering one or more configuration settings, so that the user can enhance his standing amongst other users in the power savings community. Accordingly, the power management unit 118 may be configured to cause the received aggregated community power consumption statistics to be displayed on a display such that a user may view the statistics.

In some embodiments, the power management unit 118 may be configured to access power savings information from the community power savings portal 104. This power savings information may detail how a user may select a device power profile and/or modify configuration settings to reduce the amount of power consumed by a user device 102. In some embodiments, the power management unit 118 may be configured to download applications, drivers, etc. from the community power savings portal 104. These downloadable items may be optimized to consume less power than comparable applications, drivers, etc. and thus may help reduce power consumed by the user device 102.

Referring now to the community power savings portal 104, the community power savings portal 104 may include various means, such as a processor 120, memory 122, communication interface 124, and statistics aggregation unit 126 for performing the various functions herein described. These means of the community power savings portal 104 as described herein may be embodied as, for example, hardware elements (e.g., a suitably programmed processor, combinational logic circuit, and/or the like), computer code (e.g., software or firmware) embodied on a computer-readable medium (e.g. memory 122) that is executable by a suitably configured processing device (e.g., the processor 120), or some combination thereof. The processor 120 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 120 may be configured to execute instructions stored in the memory 122 or otherwise accessible to the processor 120. Although illustrated in FIG. 1 as a single processor, the processor 120 may comprise a plurality of processors, which may operate in parallel. In embodiments wherein the processor 120 is embodied as a plurality of processors, the plurality of processors may be embodied in a single computing device or in a plurality of computing devices operating cooperatively to implement the community power savings portal 104.

The memory 122 may include, for example, volatile and/or non-volatile memory. The memory 122 may be configured to store information, data, applications, instructions, or the like for enabling community power savings portal 104 to carry out various functions in accordance with exemplary embodiments of the present invention. For example, the memory 122 may be configured to buffer input data for processing by the processor 120. Additionally or alternatively, the memory 122 may be configured to store instructions for execution by the processor 120. The memory 122 may comprise one or more databases that store information in the form of static and/or dynamic information. In this regard, the memory 122 may store, for example, power consumption statistics for a plurality of devices (e.g., user device 102 and remote user devices 106) of the system 100. This stored information may be stored and/or used by the statistics aggregation unit 126 during the course of performing its functionalities.

The communication interface 124 may be embodied as any device or means embodied in hardware, software, firmware, or a combination thereof that is configured to receive and/or transmit data from/to a remote device, such as a user device 102 and/or remote user device 106 over the network 108. In one embodiment, the communication interface 124 may be at least partially embodied as or otherwise controlled by the processor 120. The communication interface 124 may include, for example, an antenna, a transmitter, a receiver, a transceiver and/or supporting hardware or software for enabling communications with other entities of the system 100. The communication interface 124 may be configured to receive and/or transmit data using any protocol that may be used for communications between computing devices of the system 100. The communication interface 124 may additionally be in communication with the memory 122 and/or statistics aggregation unit 126, such as via a bus.

The statistics aggregation unit 126 may be embodied as various means, such as hardware, software, firmware, or some combination thereof and, in one embodiment, may be embodied as or otherwise controlled by the processor 120. In embodiments wherein the statistics aggregation unit 126 is embodied separately from the processor 120, the statistics aggregation unit 126 may be in communication with the processor 120. The statistics aggregation unit 126 may be configured to provide a community portal for which users of user devices 102 may register for and/or access and receive community power savings information. In this regard, the statistics aggregation unit 126 may be configured, for example, to provide a web interface that may be accessed by a user device 102 over the network 108. The group of users who are registered with or otherwise use the community power savings portal 104 may comprise a power savings community.

The statistics aggregation unit 126 may be configured to receive power consumption statistics from a plurality of devices associated with a power savings community and may store the received power consumption statistics in the memory 122. In this regard, the statistics aggregation unit 126 may be configured to receive power consumption statistics from a user device 102. The received power consumption statistics received from a user device 102 may comprise a pre-calculated indication of an amount of power saved by the user device 102 which was calculated at the user device 102, such as by the power management unit 118. In some instances, the received power consumption statistics may not comprise a pre-calculated indication of an amount of power saved by the user device 102 and may instead comprise raw figures detailing measured power consumed by the user device 102 and/or one or more individual components of the user device 102 over a period of time. In such instances, the statistics aggregation unit 126 may be configured to calculate an amount of power saved by the user device 102 of the user device 102 over a period of time, such as by implementing a device power profile, based at least in part upon a comparison of the actual measured power consumed by the user device 102 to an established baseline power consumption level for the user device 102. Similarly, the statistics aggregation unit 126 may be configured to calculate power saved by a component of the user device by comparing actual power consumed by the component to a baseline power consumption level for that component. The baseline power consumption level may represent the amount of power that would be consumed if a device power profile comprising factory default configuration settings and/or average (e.g., most popular) configuration settings were implemented by the user device 102. In still other embodiments, the baseline power consumption level may represent the amount of power consumed by an average user device 102 of the system 100 as determined by the statistics aggregation unit 126 from received power consumption statistics. In some embodiments, the baseline power consumption level may represent a value determined by the statistics aggregation unit 126 representative of an average amount of power consumed by user devices 102 of the system 100 whose users have not implemented a device power profile so as to reduce power consumption in their user device 102. The baseline power consumption level may depend on a model or type of user device 102 and accordingly, the statistics aggregation unit 126 may be configured to determine an identity or type of the user device 102 from which power consumption statistics were received prior to selecting an appropriate baseline power consumption level and calculating an amount of power saved. The statistics aggregation unit 126 may determine this identity or type from information received from the user device 102, from a registration record for the user of the user device 102, and/or through other similar available means.

The statistics aggregation unit 126 may be further configured to aggregate the received power consumption statistics and may extrapolate and/or calculate community power consumption statistics based at least in part upon the aggregated power consumption statistics. The statistics aggregation unit 126 may store the aggregated community power consumption statistics in memory 122. For example, the statistics aggregation unit 126 may be configured to aggregate the received power consumption statistics to calculate a total amount of power saved by users of the power savings community. This total amount of power saved may be further broken down by type or category of device component such that a total amount of power saved by all users of the system 100 for each type or category of device component may be calculated (e.g. total power saved by reducing backlight illumination, reducing clock cycle, etc). Additionally or alternatively, the total amount of power saved may be broken down by a type or category of user device 102. For example, all Nokia N-series devices may comprise one category and the statistics aggregation unit 126 may be configured to calculate a total amount of power saved by all users of the power savings community having Nokia N-series devices. In another example, the Nokia E71 may comprise a device type and the statistics aggregation unit 126 may be configured to calculate a total amount of power saved by all users of the power savings community having Nokia E71 devices.

The statistics aggregation unit 126 may additionally or alternatively be configured to aggregate the received power consumption statistics to generate an ordered ranking of users of the power savings community based at least in part upon an amount of power saved by each of the plurality of devices. The statistics aggregation unit 126 may be further configured to rank users in order of power saved for one or more categories or types of device components (e.g., most power saved by reducing backlight illumination, reducing clock cycle, etc). Additionally or alternatively, the statistics aggregation unit 126 may be configured to rank users according to an amount of power saved based at least in part upon a type or category of user device 102 used by each user. For example, all Nokia N-series devices may comprise one category and the statistics aggregation unit 126 may be configured to rank users of the power savings community having Nokia N-series devices based at least in part upon an amount of power saved by each user. In another example, the Nokia E71 may comprise a device type and the statistics aggregation unit 126 may be configured to rank users of the power savings community having Nokia E71 devices based at least in part upon an amount of power saved by each user.

The statistics aggregation unit 126 may be further configured to provide aggregated community power consumption statistics, such as may be stored in memory 122, to remote devices of the system 100, such as to a user device 102. In this regard, the statistics aggregation unit 126 may be configured to provide aggregated community power consumption statistics to a user device 102 in response to receipt of a request from the user device 102, such as may comprise, for example, requesting a web page comprising aggregated community power consumption statistics and/or power consumption statistics for the requesting user.

In some embodiments, the statistics aggregation unit 126 may be configured to provide users with information on how they may select a device power profile and/or modify configuration settings to reduce the amount of power consumed by their user device 102. Further, the statistics aggregation unit 126 may be configured to provide applications, drivers, and/or the like for download by a user device 102. These downloadable items may be optimized to consume less power than comparable applications, drivers, etc. and thus may help reduce power consumed by a user device 102. In some embodiments, the statistics aggregation unit 126 may be configured to induce a user of a user device 102 to implement a device power profile that may reduce power consumption in a user device 102 and/or to otherwise participate in the power savings community. For example, the statistics aggregation unit 126 may be configured to provide additional service offerings, discounts on services, and/or the like to users who implement a power efficient device power profile and/or otherwise participate in services offered by the community power savings portal 104.

Accordingly, users may be encouraged to reduce the amount of power consumed by their user device 102 by having access to information on how to optimize their user device 102 to reduce power. Users may find further encouragement through community aspects of the system 100 such that a user of a user device 102 may be able to compare the amount of power saved by the user's user device 102 in comparison to remote user devices 106 of other users.

In some embodiments, the system 100 may comprise a portion of a system for providing a plurality of services to users of computing devices, such as, for example, a user device 102. In this regard, and referring now to FIG. 4, an embodiment of a system 400 for providing a plurality of services, including community power savings information, to computing devices in accordance with aspects of the present invention is illustrated. The system 400 may include an account management provider 400 and a service provider 410 in addition to the elements of the system 100. In this regard, the user device 102, the community power savings portal 104, plurality of remote user devices 106, the account management provider 400, and the service provider 410 may be interconnected via the illustrated network 108.

Figure 4:
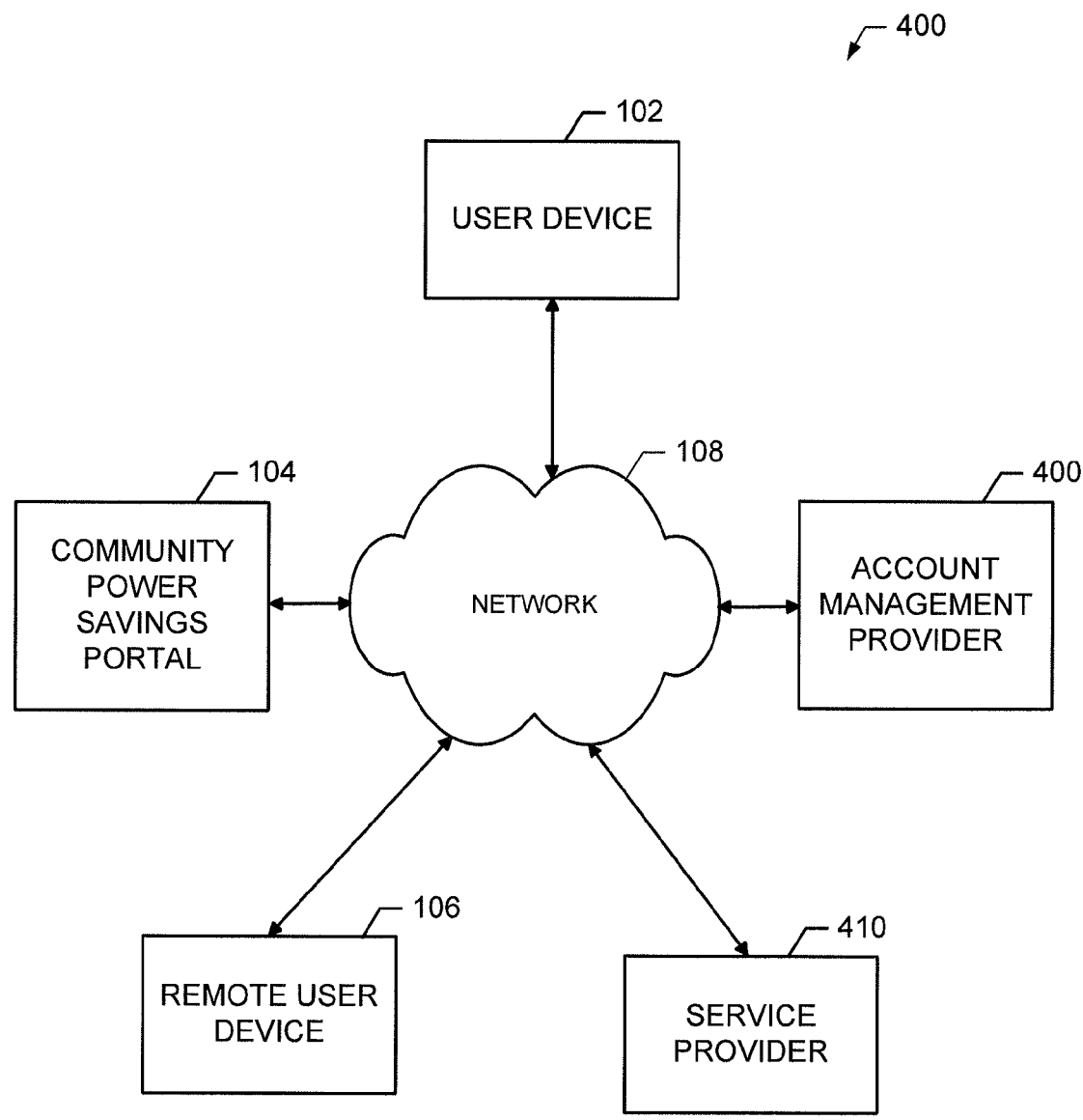
FIG. 4 illustrates a block diagram of a system for providing a plurality of services, including community power savings information, to computing devices according to an exemplary embodiment of the present invention.

The account management provider 400 may comprise any computing device or plurality of computing devices configured to (e.g., through specially configured hardware, such as, an appropriately configured processor, and/or through specially configured software, such as may be executed by a processor) provide a single service sign-on and/or interface to a plurality of services and/or service providers such that a user of a computing device may access a plurality of services through a single integrated account interface provided by the account management provider 400. An example of the functionality that may be provided by an account management provider 400 may be found at Nokia's www.ovi.com. As used herein, "service" may include data or other content as well as services, such as, for example, e-mail, instant messaging, multi-player gaming, peer-to-peer file transfer, web browsing, social networking, photograph hosting, video hosting, and other multimedia hosting services that may be accessed by and/or supplied to remote computing devices over a network or communications link, such as the network 108. In this regard, the provision of community power savings statistics and information by the community power savings portal 104 may comprise a service. Accordingly, a user of a computing device may be able to access the community power savings portal 104 through the account management provider 400. Users may register computing devices, such as, for example, a user device 102, with the account management provider 400 such that the user may access services (e.g., community power savings services) from the account management provider 400 using the user device 102. These services may be provided by the service provider 410 and/or community power savings portal 104. Although only one service provider 410 is shown in FIG. 4, the system 400 may comprise a plurality of service providers 410. In this regard, each service provider 410 represents a service provider, such as, for example, a multimedia service provider, which may be accessed through the account management provider 400.

Accordingly, a user of a user device 102 may register or otherwise interface a user device 102 with the account management provider 400. Subsequent to registering a user device 102 with the account management provider 400, a user may log into the account management provider 400 and access community power savings services as described in connection to the system 100 from the community power savings portal 104.

Figure 5:
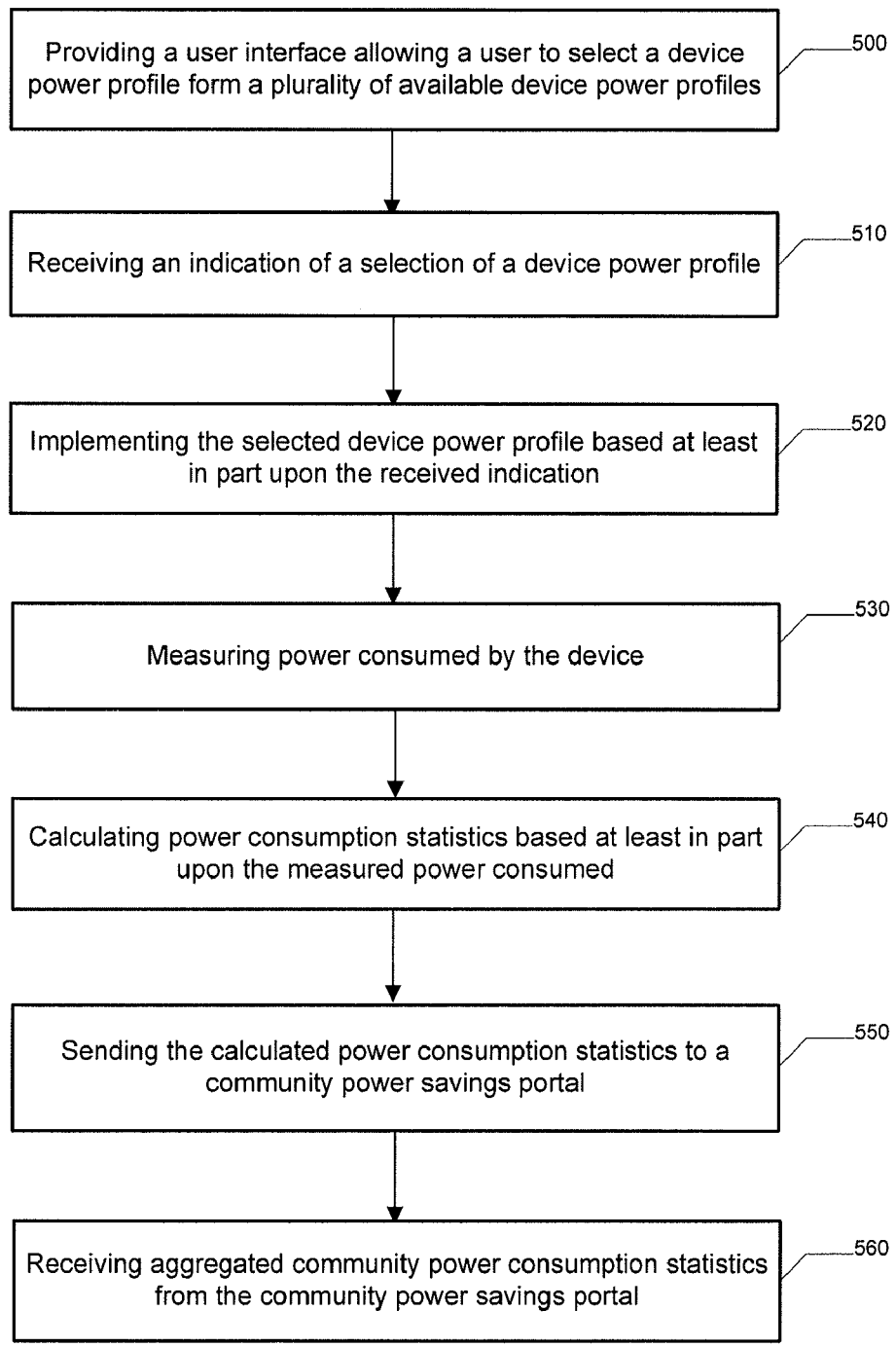
FIG. 5 is a flowchart according to an exemplary method for reducing power consumption in a computing device according to an exemplary embodiment of the present invention.
Figure 6:
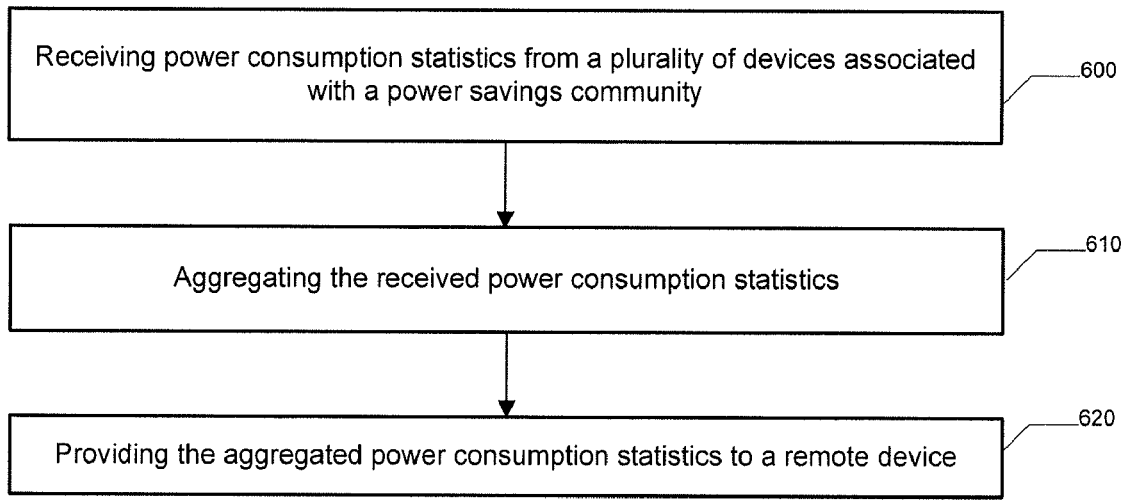
FIG. 6 is a flowchart according to an exemplary method for providing community power consumption statistics according to an exemplary embodiment of the present invention.

FIGS. 5-6 are flowcharts of systems, methods, and computer program products according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block (s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for reducing power consumption in a computing device according to an exemplary embodiment of the present invention is illustrated in FIG. 5. The method may include the user interface 116 and/or the power management unit 118 providing a user interface allowing a user to select a device power profile from a plurality of available device power profiles, at operation 500. Operation 510 may comprise the power management unit 118 receiving an indication of a selection of a device power profile. The power management unit 118 may then implement the selected device power profile based at least in part upon the received indication, at operation 520. Operation 530 may comprise the power management unit 118 measuring power consumed by the user device 102. The power management unit 118 may then calculate power consumption statistics based at least in part upon the measured power consumed, at operation 540. Operation 550 may comprise the power management unit 118 sending the calculated power consumption statistics to a community power savings portal 104. The power management unit 118 may then receive, such as in response to a user access request, aggregated community power consumption statistics from the community power savings portal 104, at operation 560.

FIG. 6 illustrates a flowchart according to an exemplary method for providing community power consumption statistics according to an exemplary embodiment of the present invention. The method may include the statistics aggregation unit 126 receiving power consumption statistics from a plurality of devices (e.g., user devices 102 and remote user devices 106) associated with a power savings community, at operation 600. Operation 610 may comprise the statistics aggregation unit 126 aggregating the received power consumption statistics. The statistics aggregation unit 126 may then provide the aggregated power consumption statistics to a remote device, such as a user device 102, at operation 620. In this regard, the statistics aggregation unit 126 may send aggregated power consumption statistics to a user device 102, such as in response to a request received from the user device 102.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for reducing power consumed by computing devices and thus may reduce the environmental impact of computing device usage. In this regard, embodiments of the invention may provide for a power savings community that may promote eco-awareness by facilitating the dissemination of information about how to reduce power usage in computing devices and may provide users of the community with information about their standing in the community with respect to an amount of power each user has saved in their computing device by altering configuration settings to conserve power through implementation of a device power profile. Embodiments of the invention may provide for monitoring power consumption in a computing device and calculating power consumption statistics based at least in part upon the measured power consumed, which may indicate how much power consumption in a computing device has been reduced from a baseline power consumption level for the computing device through implementation of a device power profile. Accordingly, users may benefit from reduced operating costs due to reduced power consumption, reduced environmental impact, and a positive feeling resulting from taking steps to help the environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or or functions than those explicitly described above are also contemplated as may be set forth in some of the appended claims. Although specific terms are employed herein, they are used in a generic and descriptive sense only and not for purposes of limitation.

What is claimed is:
1. A method comprising:
providing a user interface allowing a user to select a device power profile from a plurality of available device power profiles, wherein each device power profile defines one or more configuration settings to manage power consumption in the device;
receiving an indication of a selection of a device power profile;
causing the selected device power profile to be implemented based at least in part upon the received indication;
measuring power consumed by the device;
calculating power consumption statistics based at least in part upon the measured power consumed;
causing the calculated power consumption statistics to be sent to a community power savings portal; and
receiving aggregated community power consumption statistics from the community power savings portal, wherein the aggregated community power consumption statistics indicate a ranking of the amount of power saved by the device in relation to a plurality of devices.

2. A method according to claim 1, further comprising, receiving one or more configuration settings; and
defining a new device power profile based at least in part upon the received configuration settings; and
wherein the plurality of available device power profiles comprises the new device power profile.

3. A method according to claim 1, further comprising receiving sensory information, the sensory information comprising information about a current state of the device; and
wherein implementing the selected device power profile comprises implementing a configuration setting of the selected device power profile based at least in part upon the received sensory information.

4. A method according to claim 1, wherein calculating power consumption statistics comprises calculating power saved in the device by implementing the selected device power profile based at least in part upon a comparison of the power consumed to a pre-measured baseline power consumption level for the device.

5. A method according to claim 1, further comprising displaying the received aggregated community power consumption statistics on a display.

6. A method comprising:
receiving power consumption statistics from a plurality of devices associated with a power savings community;
aggregating the received power consumption statistics;
determining a ranking of a remote device among the plurality of devices using the received power consumption statistics; and
causing the ranking to be provided to the remote device.

7. A method according to claim 6, wherein:
aggregating the received power consumption statistics comprises aggregating the received power consumption statistics to calculate a total amount of power saved by users of the plurality of devices; and
providing the aggregated power consumption statistics comprises providing the total amount of power saved to the remote device.

8. A method according to claim 6, wherein:
aggregating the received power consumption statistics comprises aggregating the received power consumption statistics to generate an ordered ranking of users of the plurality of devices based at least in part upon an amount of power saved by each of the plurality of devices; and
providing the aggregated power consumption statistics comprises providing a ranking of a user to the remote device.

9. A computer program product comprising at least one non-transitory computer-readable storage medium having computer-readable program instructions stored therein, the computer-readable program instructions comprising:
a program instruction for providing a user interface allowing a user to select a device power profile from a plurality of available device power profiles, wherein each device power profile defines one or more configuration settings to manage power consumption in the device;
a program instruction for receiving an indication of a selection of a device power profile;
a program instruction for implementing the selected device power profile based at least in part upon the received indication;
a program instruction for measuring power consumed by the device; and
a program instruction for calculating power consumption statistics based at least in part upon the measured power consumed;
a program instruction for causing the calculated power consumption statistics to be sent to a community power savings portal; and
a program instruction for receiving aggregated community power consumption statistics from the community power savings portal, wherein the aggregated community power consumption statistics indicate a ranking of the amount of power saved by the device in relation to a plurality of devices.

10. A computer program product according to claim 9, further comprising:
a program instruction for receiving one or more configuration settings; and
a program instruction for defining a new device power profile based at least in part upon the received configuration settings; and
wherein the plurality of available device power profiles comprises the new device power profile.

11. A computer program product according to claim 9, further comprising:
a program instruction for receiving sensory information, the sensory information comprising information about a current state of the device; and
wherein the program instruction for implementing the selected device power profile includes instructions for implementing a configuration setting of the selected device power profile based at least in part upon the received sensory information.

12. A computer program product according to claim 9, wherein the program instruction for calculating power consumption statistics includes instructions for calculating power saved in the device by implementing the selected device power profile based at least in part upon a comparison of the power consumed to a pre-measured baseline power consumption level for the device.

13. A computer program product according to claim 9, further comprising a program instruction for displaying the received aggregated community power consumption statistics on a display.

14. A computer program product comprising at least one non-transitory computer-readable storage medium having computer-readable program instructions stored therein, the computer-readable program instructions comprising:
a program instruction for receiving power consumption statistics from a plurality of devices associated with a power savings community;
a program instruction for aggregating the received power consumption statistics;

a program instruction for determining a ranking of a remote device among the plurality of devices using the received power consumption statistics; and a program instruction for causing the ranking to be provided to the remote device.

15. A computer program product according to claim 14, wherein:

the program instruction for aggregating the received power consumption statistics includes instructions for aggregating the received power consumption statistics to calculate a total amount of power saved by users of the plurality of devices; and the program instruction for providing the aggregated power consumption statistics includes instructions for providing the total amount of power saved to the remote device.

16. A computer program product according to claim 14, wherein:

the program instruction for aggregating the received power consumption statistics includes instructions for aggregating the received power consumption statistics to generate an ordered ranking of users of the plurality of devices based at least in part upon an amount of power saved by each of the plurality of devices; and the program instruction for providing the aggregated power consumption statistics comprises instructions for providing a ranking of a user to the remote device.

17. An apparatus comprising at least one processor and at least one memory storing computer program code, wherein the at least one memory and stored computer program code are configured, with the at least one processor, to cause the apparatus to at least:

provide a user interface allowing a user to select a device power profile from a plurality of available device power profiles, wherein each device power profile defines one or more configuration settings to manage power consumption in the device;

receive an indication of a selection of a device power profile;

implement the selected device power profile based at least in part upon the received indication;

measure power consumed by the device;

calculate power consumption statistics based at least in part upon the measured power consumed;

cause the calculated power consumption statistics to be sent to a community power savings portal; and receive aggregated community power consumption statistics from the community power savings portal, wherein the aggregated community power consumption statistics indicate a ranking of the amount of power saved by the device in relation to a plurality of devices.

18. An apparatus according to claim 17, wherein the processor is further configured to:

receive one or more configuration settings; and define a new device power profile based at least in part upon the received configuration settings; and wherein the plurality of available device power profiles comprises the new device power profile.

19. An apparatus according to claim 17, wherein the processor is further configured to receive sensory information, the sensory information comprising information about a current state of the device; and wherein the processor is configured to implement the selected device power profile by implementing a configuration setting of the selected device power profile based at least in part upon the received sensory information.

20. An apparatus according to claim 17, wherein the processor is configured to calculate power consumption statistics by calculating power saved in the device by implementing the selected device power profile based at least in part upon a comparison of the power consumed to a pre-measured baseline power consumption level for the device.

21. An apparatus according to claim 17, further comprising a display; and wherein the processor is further configured to display the received aggregated community power consumption statistics on the display.

22. An apparatus comprising at least one processor and at least one memory storing computer program code, wherein the at least one memory and stored computer program code are configured, with the at least one processor, to cause the apparatus to at least:

receive power consumption statistics from a plurality of devices associated with a power savings community;

aggregate the received power consumption statistics;

determine a ranking of a remote device among the plurality of devices using the received power consumption statistics; and cause the ranking to be provided to the remote device.

23. An apparatus according to claim 22, wherein the processor is configured to:

aggregate the received power consumption statistics by aggregating the received power consumption statistics to calculate a total amount of power saved by users of the plurality of devices; and provide the aggregated power consumption statistics by providing the total amount of power saved to the remote device.

24. An apparatus according to claim 22, wherein the processor is configured to aggregate the received power consumption statistics by aggregating the received power consumption statistics to generate an ordered ranking of users of the plurality of devices based at least in part upon an amount of power saved by each of the plurality of devices; and provide the aggregated power consumption statistics by providing a ranking of a user to the remote device.

* * * * *